United States Patent Office

2,748,125
Patented May 29, 1956

2,748,125

1-SUBSTITUTED-4-SULFAMYLPIPERAZINE AND METHOD OF PREPARING THE SAME

Corris M. Hofmann, Bound Brook, N. J., assignor to American Cyanamid Company, New York, N. Y., a corporation of Maine No Drawing. Application April 26, 1954, Serial No. 425,764

8 Claims. (Cl. 260—256.5)

This invention relates to new organic compounds. More particularly, it relates to N-dialkylsulfamylpiperazines and their preparation.

N-dialkylcarbamylpiperazines, in which the other nitrogen atom of the piperazine nucleus is substituted with a heterocyclic radical, have been described in United States Patents 2,602,792; 2,519,715 and 2,602,796. The replacement of the carbamyl group with a sulfamyl group, however, results in a new series of compounds with very different properties. The carbamylpiperazines have analgesic properties whereas the sulfamylpiperazines have anti-convulsant activity. In the 1-dialkylcarbamyl-4-heterocyclic piperazines, if the heterocyclic radical is replaced with an alkyl radical, the compounds continue to exhibit analgesic properties and no anti-convulsant properties.

I have found that the new anti-convulsant compounds of the present invention can be illustrated by the following general formula:

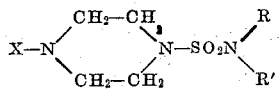

in which R and R' are alkyl radicals and X is a 5 or 6-membered monocyclic radical consisting of carbon, carbon and nitrogen or carbon, nitrogen and sulfur. Since the compounds have basic groups present they may occur in the form of salts.

The new compounds of the present invention are white crystalline solids, in general, insoluble in water and soluble in the usual organic solvents. In the form of their salts they are soluble in water and almost insoluble in organic solvents.

It is preferred to prepare the compounds of the present invention by the treatment of a N-(cyclic-substituted)-piperazine with a dialkylsulfamyl halide, generally in the presence of a non-polar solvent such as benzene. This process may be illustrated by the following equation:

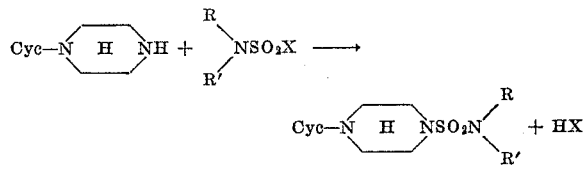

in which Cyc is a cyclic radical and R, R' and X are as hereinbefore defined.

The desired product is then isolated either in the form of its base or as a hydrohalide salt by subsequent treatment with a hydrohalide such as hydrogen chloride. The use of an alkaline substance as an acid binding agent in carrying out the process is preferred, although the reaction can take place without the alkaline substance since a basic group is present in the starting compound which could bind the hydrogen halide formed. The alkaline substance can be a compound such as triethylamine, trimethylamine, and the like. When an alkaline substance is used it can be removed usually as the hydrohalide salt thereof by filtration. The solvent is then removed and the crude product obtained. This product may be purified by the usual method of purification involving crystallization from an organic solvent such as ethanol with or without the addition of water to modify the solubility.

The above mentioned process is preferred because of the availability of starting material. However, there are a number of other general methods which can be used to prepare the compounds of the present invention. For example, reacting a 1-dialkylsulfamylpiperazine with a heterocyclic halogen compound. This reaction, using chloropyrimidine, may be illustrated by the following equation:

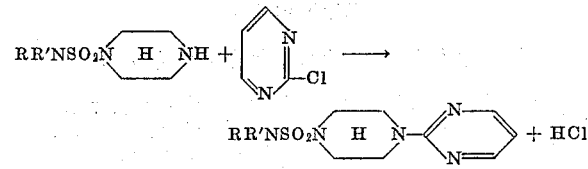

in which R and R' are as hereinbefore defined.

The compounds of the present invention exhibit anti-convulsant activity and are useful for this purpose.

The following examples describe the preparation of representative 1-cyclic-4-dialkylsulfamylpiperazines within the scope of the present invention.

EXAMPLE 1

*1-(2-thiazolyl)-4-diethylsulfamylpiperazine*

A solution of 33.8 parts of 1-(2-thiazolyl)piperazine, 20.2 parts of triethylamine and 200 parts of dry benzene is stirred and cooled. To this solution is added 34.3 parts of diethylsulfamyl chloride and the mixture is stirred for about seven hours and then filtered. The solvent is removed from the filtrate by evaporation at reduced pressure, leaving the product as a dark brown solid, which can be purified from 85 parts of aqueous ethanol. After two recrystallizations from aqueous ethanol there are obtained 32.6 parts of a solid melting at 74.5°–75.5° C.

EXAMPLE 2

*1-(2-pyridyl)-4-diethylsulfamylpiperazine*

This compound is prepared in the same manner as that described in Example 1 except that 32.6 parts of 1-(2-pyridyl)piperazine are used in place of the 33.8 parts of 1-(2-thiazolyl)piperazine. The crude product, obtained in good yield, is recrystallized from warm hexane, or from a mixture of benzene and hexane, to give the pure product which melts at 55°–56° C.

EXAMPLE 3

*1-phenyl-4-diethylsulfamylpiperazine hydrochloride*

In the preparation of this compound a method similar to Example 1 is used except that 32.4 parts of 1-phenylpiperazine are used in place of the 33.8 parts of 1-(2-thiazolyl)piperazine. The crude product as the base is dissolved in ether and treated with an ethanol solution saturated with hydrogen chloride. This causes the hydrochloride to separate as a white solid which is recrystallized from hot isopropyl alcohol. This salt melts at 170.5°–171° C.

EXAMPLE 4

*1-(4-chlorophenyl)-4-diethylsulfamylpiperazine hydrochloride*

A solution of 46.6 parts of 1-(4-chlorophenyl)-piperazine hydrochloride in 400 parts of water is treated with 60 parts of 5 N caustic. This mixture is extracted with"

300 parts of benzene and to this benzene solution, after drying, is added 20.2 parts of triethylamine. The resulting solution is stirred, cooled and treated with 34.3 parts of diethylsulfamyl chloride. The product is obtained as a solid material.

EXAMPLE 5

*1-(2-chlorophenyl)-4-dimethylsulfamylpiperazine*

The procedure in preparing this compound is similar to Example 4 except that 46.6 parts of 1-(2-chlorophenyl)piperazine hydrochloride are used in place of the 4-chloro compound and 28.7 parts of dimethylsulfamyl chloride are used in place of the 34.3 parts of diethylsulfamyl chloride. The product is isolated in good yield as a tan solid. It is recrystallized from dilute methanol giving a white solid with a melting point of 60.5°–61.5 C.

EXAMPLE 6

*1-(2-pyrimidyl)-4-dimethylsulfamylpiperazine*

A solution of 32.8 parts of 1-(2-pyrimidyl)piperazine in 200 parts of dry benzene is stirred and cooled, as 28.7 parts of dimethylsulfamyl chloride are added. After stirring for about two hours the mixture is allowed to stand at room temperature overnight and then filtered. The solid material is purified by dissolving in warm water to which some hydrochloric acid has been added and reprecipitating the product by the addition of sodium hydroxide solution. A final recrystallization from the hot ethanol gives a white solid with a melting point of 158°–158.5° C.

EXAMPLE 7

*1-(2thiazolyl)-4-dipropylsulfamylpiperazine*

The process of preparing this compound is similar to that of Example 1 except that 39.9 parts of dipropylsulfamyl chloride are used instead of the 34.3 parts of diethylsulfamyl chloride. The product is isolated as the base which is an oil. When this base is dissolved in ether and treated with an ethanol solution which has been saturated with hydrogen chloride, the hydrochloride salt separates as a nearly white solid. This salt is recrystallized from methyl ethyl ketone and melts at about 141°–142° C.

EXAMPLE 8

*1-diethylsulfamyl-4-(2-pyrimidyl)-piperazine hydrochloride*

A mixture of 159 parts of sodium carbonate, 387 parts of piperazine and 600 parts of monochlorobenzene is stirred as 257.5 parts of diethylsulfamyl chloride are added. After all the acid chloride has been added, the mixture is refluxed about 14 hours. It is then cooled and filtered to remove the inorganic salts and some of the unreacted piperazine. The filtrate is distilled at reduced pressure. The first fraction which distills contains chlorobenzene and piperazine. The product distills next with a boiling range of 130°–133° C. at 1 mm. of pressure. There is obtained 262.3 parts of distilled product, representing a 79% theoretical yield of 1-diethylsulfamylpiperazine.

A mixture of 22.1 parts of 1-diethylsulfamylpiperazine, 11.4 parts of 2-chloropyrimidine, 16.8 parts of sodium bicarbonate and 40 parts of o-dichlorobenzene is refluxed for about six hours. The mixture is then filtered to remove the inorganic salts and the filtrate is evaporated at reduced pressure to remove the solvent. The oily residue is dissolved in ether and treated with ethanol which has been saturated with hydrogen chloride. The product precipitates as a light yellow solid. This solid can be recrystallized from a mixture of 200 parts of acetone and 290 parts of methyl ethyl ketone. The purified material melts at 154.5°–155° C. and is obtained in a 69% yield.

I claim:

1. Compounds of the group consisting of those having the formula:

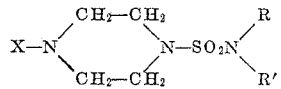

in which R and R' are lower alkyl radicals and X is a member of the group consisting of phenyl, pyridyl, pyrimidyl, and thiazolyl and therapeutically useful acid salts thereof.

2. 1-phenyl-4-diethylsulfamylpiperazine hydrochloride.
3. 1-(2-thiazolyl)-4-diethylsulfamylpiperazine.
4. 1 - (4 - chlorophenyl) - 4 - diethylsulfamylpiperazine hydrochloride.
5. 1-(2-pyrimidyl)-4-dimethylsulfamylpiperazine.
6. 1-(2-pyridyl)-4-diethylsulfamylpiperazine.
7. 1-phenyl-4-diloweralkylsulfamylpiperazines.
8. 1-pyridyl-4-diloweralkylsulfamylpiperazines.

No references cited.